US012601880B2

(12) United States Patent
Tseng

(10) Patent No.: US 12,601,880 B2
(45) Date of Patent: Apr. 14, 2026

(54) OPTICAL CONNECTOR

(71) Applicant: Chung-Ming Tseng, Myau-Li County (TW)

(72) Inventor: Chung-Ming Tseng, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 296 days.

(21) Appl. No.: 18/144,201

(22) Filed: May 7, 2023

(65) Prior Publication Data

US 2023/0358971 A1 Nov. 9, 2023

(30) Foreign Application Priority Data

May 9, 2022 (TW) ................................. 111117384

(51) Int. Cl.
*G02B 6/38* (2006.01)
(52) U.S. Cl.
CPC ................................. *G02B 6/38875* (2021.05)
(58) Field of Classification Search
CPC ................................................ G02B 6/38875
See application file for complete search history.

(56) References Cited

U.S. PATENT DOCUMENTS

| | | | | |
|---|---|---|---|---|
| 9,891,391 | B2* | 2/2018 | Watanabe | G02B 6/3887 |
| 10,539,745 | B2* | 1/2020 | Kamada | G02B 6/3893 |
| 11,314,023 | B2* | 4/2022 | Tseng | G02B 6/3825 |
| 2004/0156592 | A1* | 8/2004 | Cox | G02B 6/3893 385/76 |
| 2014/0341512 | A1* | 11/2014 | Hikosaka | G02B 6/3857 385/81 |
| 2017/0160494 | A1* | 6/2017 | Watanabe | G02B 6/3885 |
| 2020/0150357 | A1* | 5/2020 | Higley | G02B 6/3825 |
| 2022/0196927 | A1* | 6/2022 | Cloud | G02B 6/3825 |
| 2023/0358971 | A1* | 11/2023 | Tseng | G02B 6/38875 |

* cited by examiner

*Primary Examiner* — Rhonda S Peace

(57) ABSTRACT

The present invention provides an optical connector, comprising: a connector module, having a housing, a terminal module, and at least one first buckle portion, the housing having a first side and a second side opposite to the first side in a first axis, the first side having a first opening, a terminal of the terminal module protruding out of the first opening, the terminal module having a communication wire; and a boot structure, configured for coating the communication wire, wherein the boot structure has at least one second buckle structure corresponding to a side of the terminal module, and the at least one second buckle structure is buckled with at least one first buckle structure.

10 Claims, 4 Drawing Sheets

OPTICAL CONNECTOR

CROSS-REFERENCE TO RELATED APPLICATION

This application claims the benefit of Taiwan Patent Application No. 111117384, filed on May 9, 2022, in the Taiwan Intellectual Property Office of the R.O.C, the disclosure of which is incorporated herein in its entirety by reference.

FIELD OF INVENTION

The present invention relates to an optical connector. In particular, it relates to an optical connector transmitting optical signal.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In order to achieve the goal, the optical connector with optical fiber transmission medium has become the main force for the data center to increase the amount of data and the growth of the transmission rate. However, in some usage scenarios, such as transmission towers or relay stations, in addition to using optical fibers to transmit information, wires for transmitting power are also required to supply power to receivers and transmitters. Based on this demand, there are optical connector products on the market that can transmit optical signals and power at the same time.

In summary, it's necessary for an optical connector to meet the aforesaid demands on market.

The above information disclosed in this section is only for enhancement of understanding of the background of the described technology and therefore it may contain information that does not form the prior art that is already known to a person of ordinary skill in the art.

SUMMARY OF THE INVENTION

The present invention provides an optical connector. In the case that the assembled optical fiber wire is under stress, it can prevent the terminal module from bearing the force of the boot structure, which decreases the risk of rupture and damage by the engagement between the boot structure and the housing structure. In one embodiment, a first action force, which is the force of the boot structure to combine with the connector module along the central axis of the connector, is smaller than a second action force, which is the force of the boot structure to separate from the connector module.

The present invention provides an optical connector. The buckle structure is designed by the engagement between the boot structure and the housing structure. The buckle structure is integrally formed with the housing, so that the buckle structure can be stably connected with the boot structure without shacking. In addition, the buckle structures buckle with each other in the height direction of the connectors, which can avoid the problem of the optical connectors falling off due to the gap when they are inserted side by side.

The present invention provides an optical connector. The buckle structure is designed by the engagement between the boot structure and the housing structure. The buckle structure adopts the upper and lower two-piece, arc-shaped structure design, which can strengthen the strength of the buckle structure, and is not easy to cause breakage during assembly or pulling.

The present invention provides an optical connector. The buckle structure is designed by the engagement between the boot structure and the housing structure. In one embodiment, the boot structure uses a buckle structure with elastic material to buckle with the terminal module of the connector with a hard material. The hard material can protect the signal wire from damage, and the elastic material can achieve the effect of buckling with the connector module.

In one embodiment, the present invention provides an optical connector, comprising: a connector module, having a housing, a terminal module, and at least one first buckle portion, the housing having a first side and a second side corresponding to the first side in a first axis, the first side having a first opening, a terminal of the terminal module protruding out of the first opening, the terminal module having a communication wire; and a boot structure, configured for coating the communication wire, wherein the boot structure has at least one second buckle structure corresponding to a side of the terminal module, and the at least one second buckle structure is buckled with at least one first buckle structure.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1A:
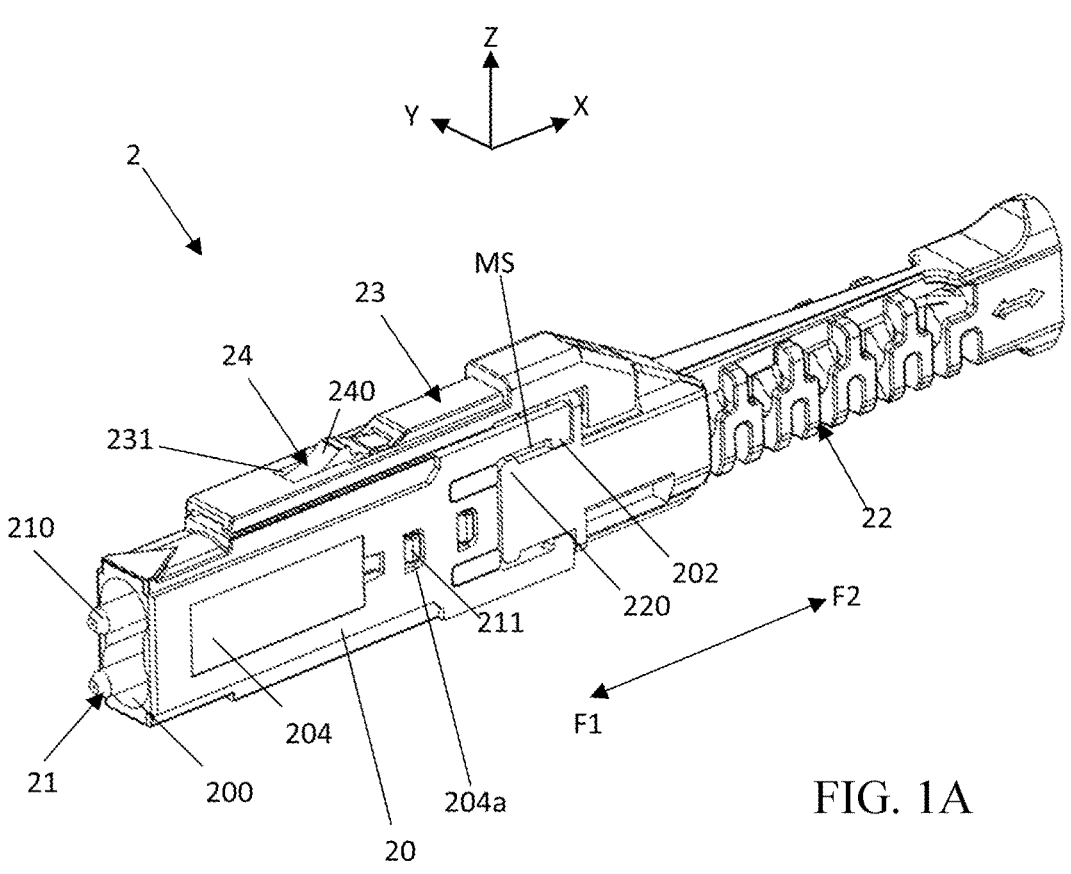
FIG. 1A is a three-dimensional diagram of the first embodiment of the optical connector in the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate an optical connector and to aid it of skilled in the art in practicing this invention. These embodiments are merely exemplary embodiments and in no way to be considered to limit the scope of the invention in any manner.

Figure 1B:
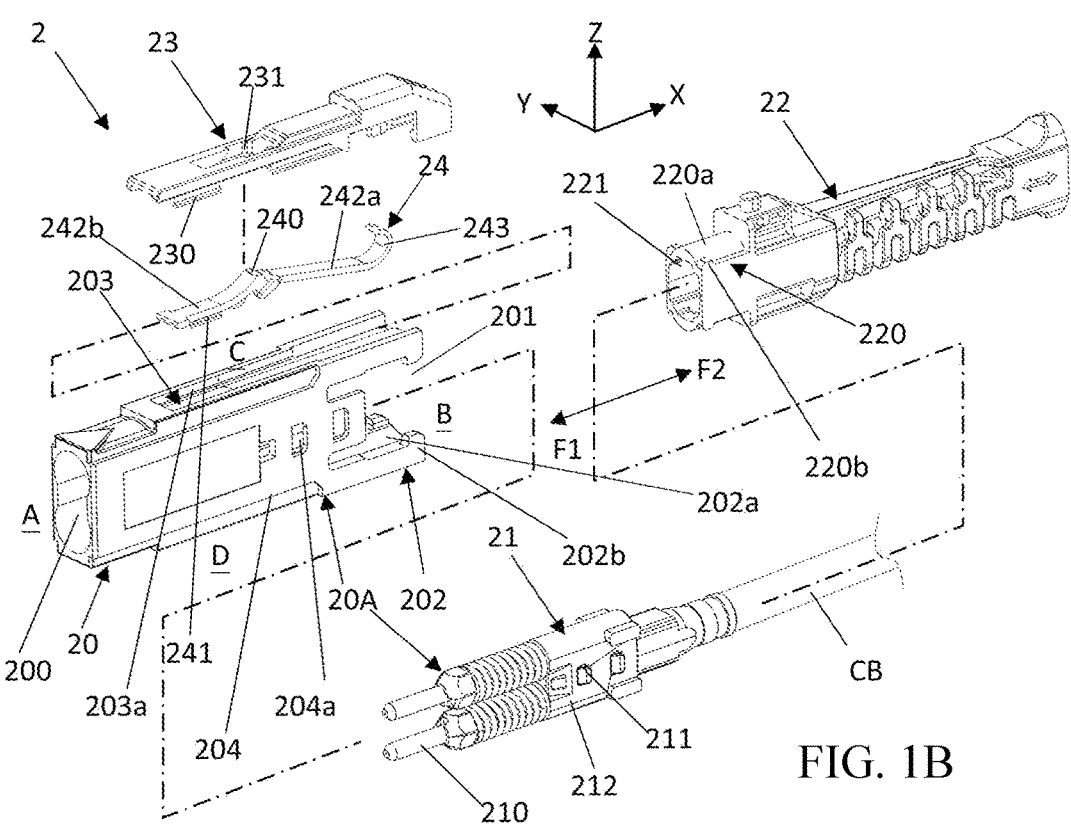
FIG. 1B is a three-dimensional exploded schematic diagram of the first embodiment of the optical connector in the present invention.

Please refer to FIGS. 1A and 1B, FIG. 1A is a three-dimensional diagram of the first embodiment of the optical connector, and FIG. 1B is a three-dimensional exploded schematic diagram of the first embodiment of the optical connector. The optical connector 2 includes a connector module 20A and a boot structure 22, wherein the connector module 20A has a housing 20 and a terminal module 21. The housing 20 has a first side A and a second side B corresponding to the first side A in the first axis X (central axis of the optical connector 2), the first side A has a first opening 200, and the second side B has a second opening 201. At least one first positioning structure 204a is disposed on the two side surfaces 204 (the side formed by XZ axis) of the housing 20. In this embodiment, the first positioning structure 204a is an opening structure.

The terminal module 21 is disposed in the housing 20, and the terminals 210 of the terminal module 21 protrude from the housing 20 to the first opening 200. The other side opposite to the terminal module 21 and the terminal 210 is coupled with a communication cable CB, such as an optical fiber, but not limited thereto. In this embodiment, the terminal module 21 has a terminal base 212 on which a second positioning structure 211 is disposed. In this embodiment, the second positioning structure 211 is a convex structure. Therefore, when the terminal module 21 is assembled in the housing 20, the first positioning structure 204a is combined with the second positioning structure 211 to achieve the effect of fixing the terminal module 21 in the housing 20.

Figure 2:
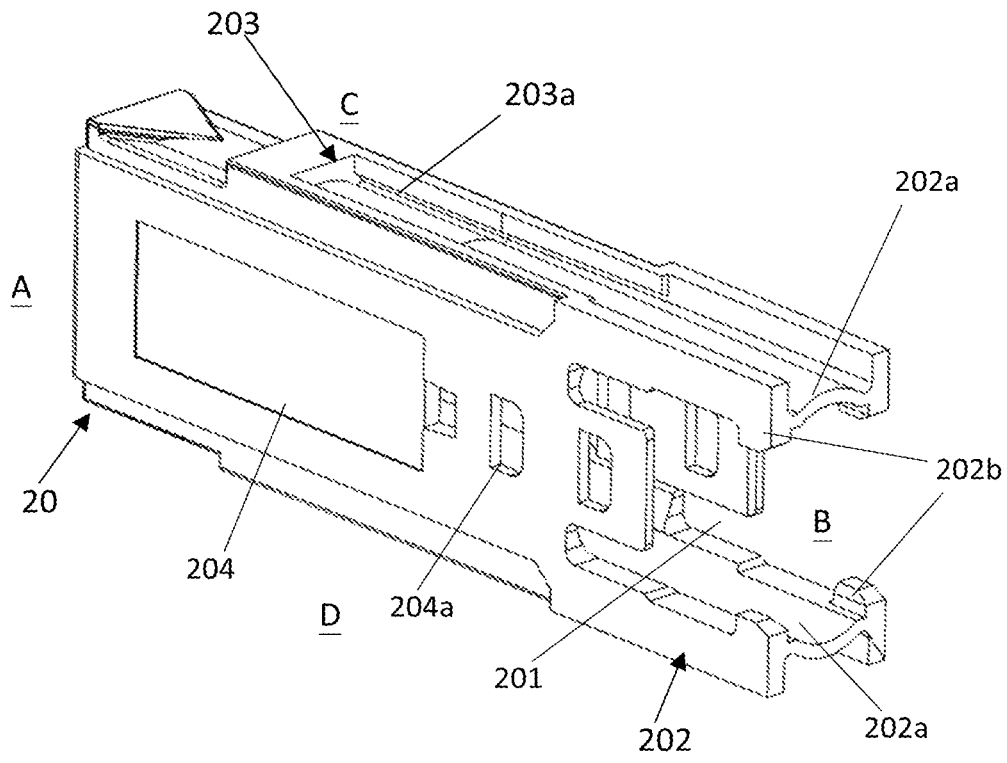
FIG. 2 is a three-dimensional schematic diagram of an embodiment of the housing in the present invention.

In order to achieve a good buckling effect between the boot structure 22 and the connector module 20A, in this embodiment, the connector module 20A further has at least one first buckling portion 202. In an embodiment, the first buckling portion 202 is disposed on the housing 20. Please refer to FIG. 2, FIG. 2 is a three-dimensional schematic diagram of an embodiment of the housing in the present invention. In this embodiment, the housing 20 has first buckle portions 202 on the third side C and the fourth side D in a third axis vertical to the first axis respectively, which are configured in pairs and extended toward the second side B. Each first buckle portion 202 further includes a first supporting structure 202a with a curvature and a first hook structure 202b at an end portion of the first supporting structure 202a. The structural strength of the first buckle portion 202 is strengthened by adopting the upper and lower two-piece, arc-shaped structure design, so that it is not easy to break when it is buckled with the second buckle portion 220 or pulled by a force. The material of the first buckle portion 202 can be made of metal or engineering plastic. In one embodiment, the first buckle portion 202 and the housing 20 are integrally formed.

Please refer to FIGS. 1A and 1B, the connector module 20A is coupled with the boot structure 22. In this embodiment, the two sides of an end portion of the boot structure 22 corresponding to the second side B respectively have a second buckle portion 220 corresponding to the first buckle portion 202. The second buckle portion 220 has a second supporting structure 220a with a radian and the second hook structure 220b at an end portion of the second supporting structure 220a. The boot structure 22 further has a through hole 221. When the boot structure 22 is connected to the connector module 20A, the through hole 221 allows the communication cable CB to pass through. In this embodiment, when the boot structure 22 is combined with the connector module 20A, the second supporting structure 220a of the boot structure 22 is leaned against the first supporting structure 202a correspondingly, so that the boot structure 22 can move axially in the central axis (X-axis direction) of the connector module 20A, but would not be separated from the connector module 20A.

The main point of the aforesaid technical features is that, as shown in FIGS. 1A and 1B, there is an axial movement space MS between the first buckle portion 202 and the second buckle portion 220, the first buckle portion 202 has a first hook structure 202b, and the second buckle portion 220 has a second hook structure 220b. After the first buckle portion 202 and the second buckle portion 220 are combined, when the boot structure 22 is pulled by an action force and moves in the X-axis, it cannot be easily pulled out of the connector module 20A due to the mutual interference forming resistance between the first buckle structure 202b and the second buckle structure 220b. The movement space may buffer the optical connector 2 to prevent it from being pulled out of the optical receptacle by mistake. It should be noted that, in this embodiment, when the boot structure 22 is assembled to the optical connector module 20A, the second buckle structure 220b forcibly passes through the first buckle structure 202b by the first action force F1, so that the boot structure 22 is movably connected to housing 20 of connector module 20A. When the boot structure 22 is pulled toward the +X axis to make the first buckle structure 202b and the second buckle structure 220b interfere with each other, the first buckle portion 202 and the second buckle portion 220 are separated by the second action force F2, so that the boot structure 22 is separated from the optical connector module 20A, wherein the second action force F2 is greater than the first action force F1.

In this embodiment, the housing 20 has a sliding groove structure 203 on the third side C, and first guiding structures 203a are formed on the inner walls of both sides thereof. There is a sliding sleeve 23 on the housing 20, and the sliding sleeve 23 is slidably arranged on the sliding groove structure 203. The sliding sleeve 23 has a plurality of second guiding structures 230 slidably connected with the first guiding structure 203a, wherein the second guiding structures 230 are sliding rails. In this embodiment, an elastic buckle 24 is disposed between the sliding sleeve 23 and the sliding groove structure 203. The elastic buckle 24 has a buckle portion 240, which may protrude out of the surface of the sliding sleeve 23 through the opening 231. Both sides of the buckle portion 240 have elastic arms 242a and 242b, and a free end of the elastic arms 242a has a leaning portion 243, which is buckled into the sliding sleeve 23. Wherein, the elastic arm 242 b of the elastic buckle 24 further has a third guiding structure 241, which is slidably disposed on the second guiding structure 230. The elastic arm 242a is connected to the elastic arm 242b with an included angle at the joint, and a buckle portion 240 is formed at the junction, which protrudes out of the opening 231. The buckle portion 240 protrudes out of the opening 231 and can be buckled with the optical receptacle (not shown), so that the optical connector 2 is fixed in the optical receptacle. Through the movement of the sliding sleeve 23 toward the +X axis, the side wall of the opening 230 of the sliding sleeve 23 pushes the buckle portion 240 to move downward, so that the optical connector 2 can be pulled out of the optical receptacle.

Figure 3A:
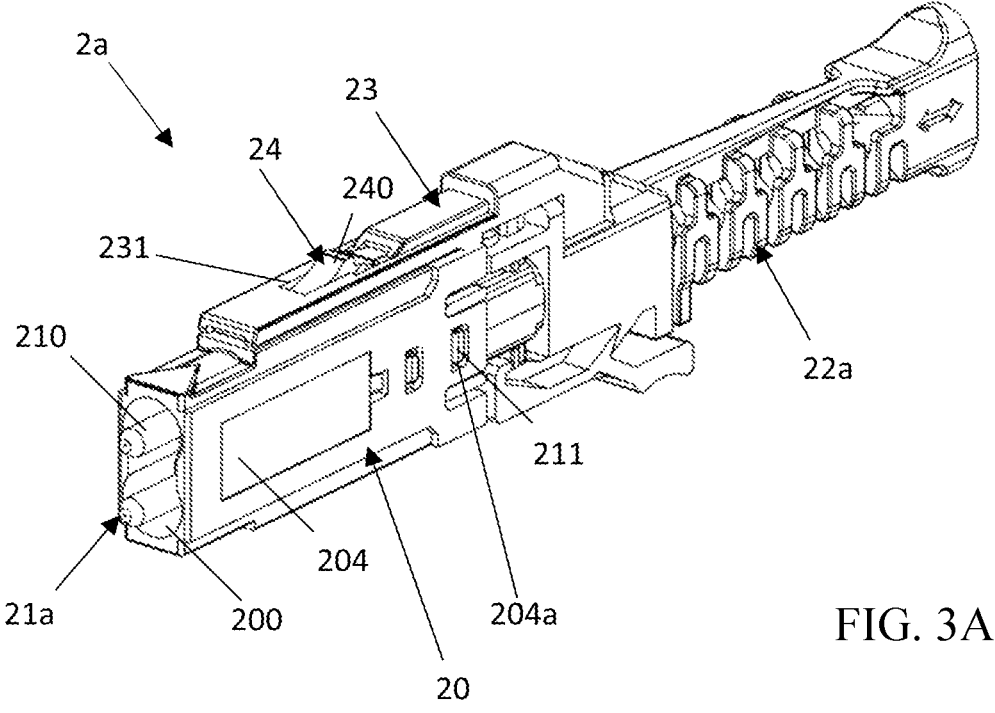
FIG. 3A is a combined schematic diagram of another embodiment of the optical connector in the present invention.
Figure 3B:
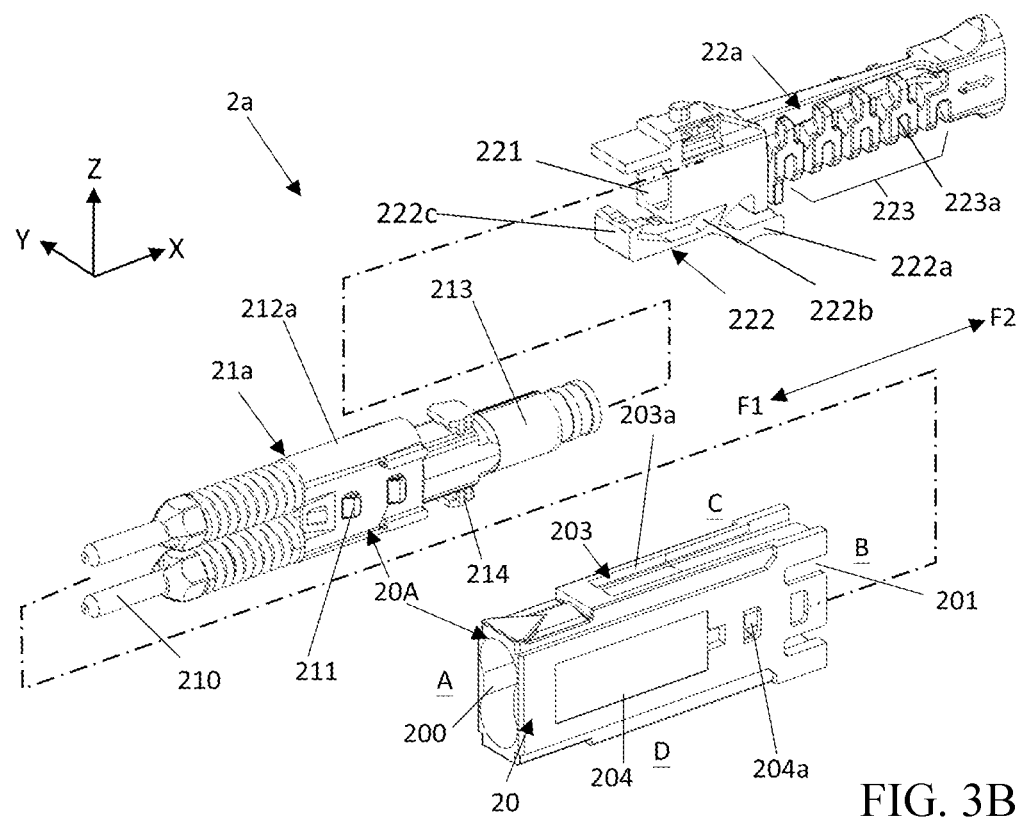
FIG. 3B is a partially exploded schematic diagram of the optical connector of FIG. 3A.
Figure 3C:
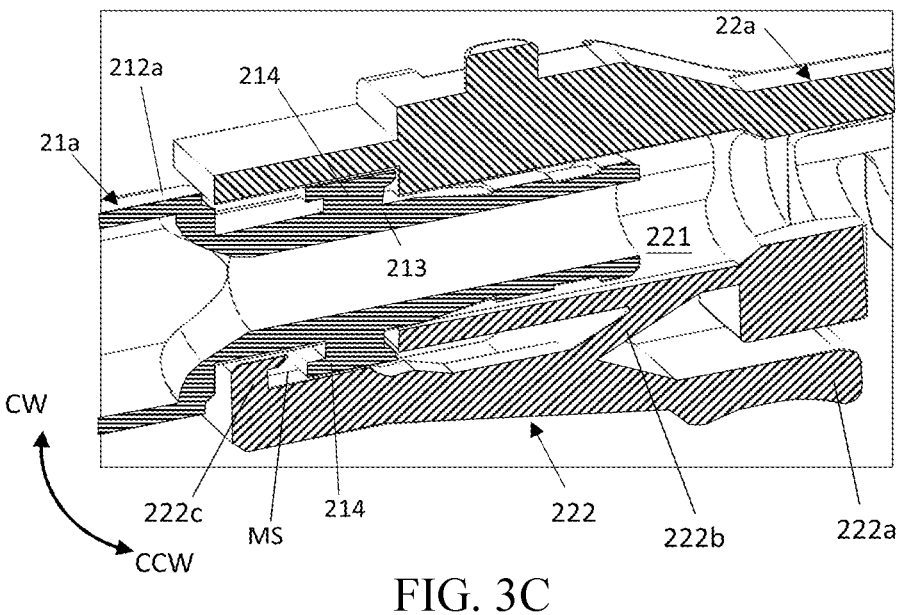
FIG. 3C is a partial cross-sectional schematic diagram of the connector module and the boot structure of the optical connector from FIG. 3A.
Figure 3D:
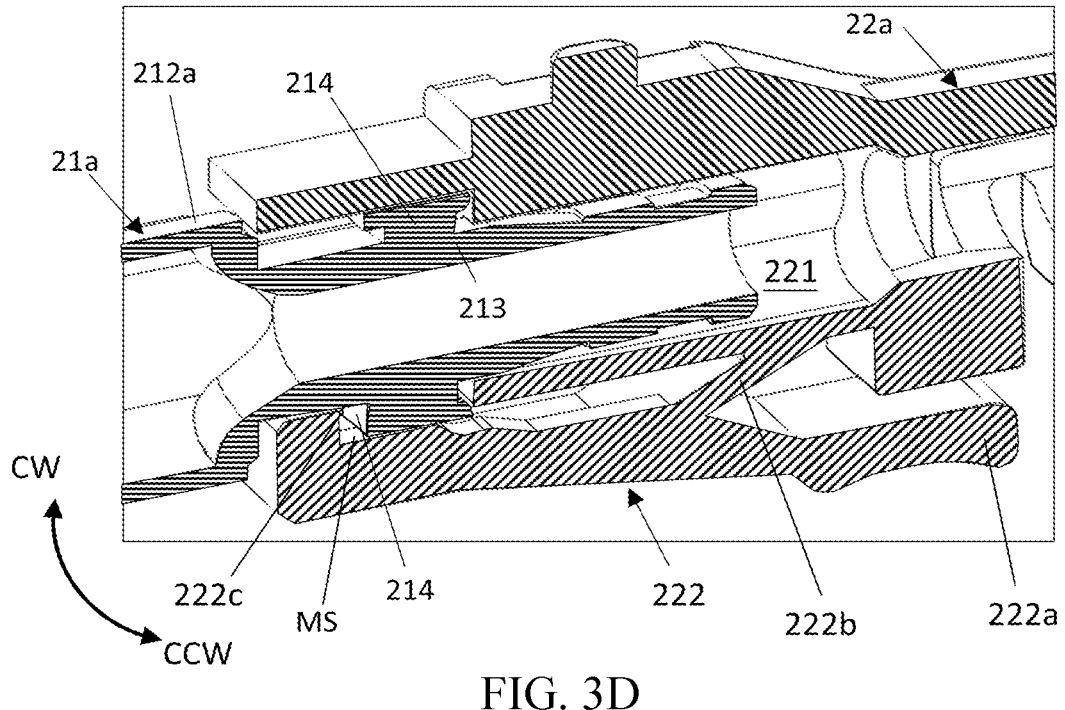
FIG. 3D is a schematic partial cross-sectional diagram of another embodiment of the connector module and boot structure of the optical connector from FIG. 3A.

Please refer to FIGS. 3A to 3C, FIG. 3A is a combined schematic diagram of another embodiment of the optical connector, FIG. 3B is a partially exploded schematic diagram of the optical connector of FIG. 3A, and FIG. 3C is a partial cross-sectional schematic diagram of the connector module and the boot structure of the optical connector from FIG. 3A. The optical connector 2a is similar to the aforementioned optical connector 2, and the same reference numeral correspond to the same elements. The difference lies in the arrangement of the first buckle portion and the second buckle portion in this embodiment. In this embodiment, the terminal module 21a is buckled by the boot structure 22a. The boot structure 22a of this embodiment is made of elastic or flexible material. One side of the terminal base 212a of the terminal module 21a is coupled to the terminal 210, and the coupling method is a conventional technology, which would not be repeated herein. A sleeve structure 213 is extended from the other side of the terminal base 212a and has a first buckle portion 214 thereon. In one embodiment, the terminal base 212a and the sleeve structure 213 are integrally formed and made of hard engineering materials, such as engineering plastics. In this embodiment, the first buckle portions 214 are arranged in pairs, so that when the polarity of the terminal module 21a changes, the effect of buckling with the boot structure 22a may still be maintained. In this embodiment, the first buckle portion 214 may be an L-shaped structure or a T-shaped structure.

A second buckle portion 222 disposed on one side of the boot structure 22a may correspond to one of the first buckle portions 214. In this embodiment, the second buckle portion 222 is disposed on the boot structure 22a corresponding to the fourth side D. The second buckle portion 222 includes a bracket 222b, one end of which is connected to the body of the boot structure 22a, and the other end of the bracket 222b is connected to a pressing plate 222a and a buckle structure 222c. When the pressing plate 222a is pressed down in one direction, the buckle structure 222c can use the bracket 222b as a fulcrum, and the lever deflects at an angle and accumulates elastic force. After the pressure is released, the buckle structure 222c returns to its original position by accumulating elastic force. When the user combines the separated boot structure 22a with the terminal module 21a, the boot structure 22a and the terminal module 21a are combined to move along the −X direction with the first action force F1, the sleeve structure 213 is embedded into the through hole 221. Therefore, the buckle structure 222c of the second buckle portion 222 is leaned against the first buckle portion 214. When the boot structure 22a continues to push in the −X direction, the user applies the first action force F1 to make the first buckle portion 214 perform a counterclockwise lever movement CCW with the bracket 222b as the fulcrum. The bracket 222b also accumulates elastic restoring force.

After the buckle structure 222c passes through the first buckle portion 214, the bracket 222b performs a clockwise lever movement CW under the elastic restoring force, and returns to the original position. There is a movement space MS between the buckle structure 222c and the first buckle portion 214, so that the boot structure 22a has a limited axial movement along the X-axis. The movement space MS can buffer the optical connector 21 to prevent it from being unplugged from the optical receptacle by mistake. If the movement exceeds the range of the movement space MS, the first buckle portion 214 and the buckle structure 222c would fit into and mutually restrain each other. Therefore, the boot structure 22a would not be separated from the terminal module 21. If the polarity of the terminal module 21a is going to be changed, a pressure can be applied on the pressure plate 222a, so that the buckle structure 222 performs a counterclockwise lever movement CCW, and break away from the position corresponding to the first buckle portion 214. Then, the second action force F2 is applied, the boot structure 22a is pulled out along the +X axis and separated from the terminal module 21a. It should be noted that, because the body of the boot structure 22a and the second buckle portion 222 are integrally formed, and the hardness of the material in this embodiment is less than that of the terminal base 212a, the boot structure 22a is used to buckle the first buckle portion 214 on the terminal base 212a of the terminal module 21a. The terminal base 212a and the tubular structure 213 of the terminal module 21a can be made of hard materials, such as engineering plastics, so that the strength of the terminal base 212a and the tubular structure 213 can be improved to protect the internal communication wires. It should be noted that if the boot structure 22a is at the thick end, the structure hardness of the boot structure 22a having the second buckle portion 222 is identical to that of the terminal base; while in the thinner area, for example: the grasping portion 223 with multiple texture structures 223a shown in FIG. 3B is made of a softer material, and an end surface of the first buckle portion 214 and the end surface of the buckle structure 222c of the second buckle portion 222 can also be a planar structure. The boot structure 22a is separated by means of the second action force F2 being greater than the first action force F1.

The present invention provides an optical connector. In the case that the assembled optical fiber wire is under stress, it can prevent the terminal module from bearing the force of the boot structure, which decreases the risk of rupture and damage by the engagement between the boot structure and the housing structure. In addition, the buckle structures buckle with each other in the height direction of the connectors, which can avoid the problem of the optical connectors falling off due to the gap when they are inserted side by side. In another embodiment, the boot structure uses a buckle structure with elastic material to buckle with the terminal module of the connector with a structure having hard material. The hard material can protect the signal wire from damage, and the elastic material can achieve the effect of buckling with the connector module.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. An optical connector, comprising:

a connector module, having a housing and a terminal module, the housing having a first side and a second side opposite to the first side in a first axis, the first side having a first opening, a terminal of the terminal module protruding out of the first opening, the terminal module having a communication wire, wherein the connector module has at least one first buckle portion, and a boot structure, configured for coating the communication wire, wherein the boot structure has at least one second buckle portion corresponding to a side of the terminal module, and the at least one second buckle portion is buckled with the at least one first buckle portion, wherein the housing has a third side and a forth side opposite to the third side in a third axis vertical to the first axis, a sliding groove structure is disposed on the third side and extended towards the boot structure, and a first guiding structure is formed on two walls within the sliding groove structure.

2. The optical connector of claim 1, wherein the housing has at least one first buckle portion, and the at least one first buckle portion and the second buckle portion are combined by a first action force, the at least one first buckle portion and the second buckle portion are separated by a second action force, and the second action force is greater than the first action force.

3. The optical connector of claim 1, wherein the terminal module has a terminal base, material hardness of the terminal base is greater than that of the boot structure, and the terminal base has the at least one first buckle portion, which is buckled with the second buckle portion of the boot structure.

4. The optical connector of claim 3, wherein the terminal module comprises:

a terminal; and a terminal base, connected to the terminal, a sleeve structure protrudes out of the second side of the terminal base to allow the communication cable to pass through, and the sleeve structure has the at least one first buckle portion.

5. The optical connector of claim 4, wherein the second buckle portion comprises:

a bracket, connected to the boot structure;

a pressing plate, connected to a side of the bracket; and a buckle structure, connected to the bracket and the pressing plate, wherein the buckle structure performs lever movement around the bracket by applying a force to the pressing plate, thereby releasing the first buckle portion.

6. The optical connector of claim 1, comprising a sliding sleeve, which is slidably disposed on the sliding groove structure, wherein the sliding sleeve has a plurality of second guiding structures slidably connected to the first guiding structure.

7. The optical connector of claim 6, comprising an elastic buckle, which is disposed between the sliding groove structure and the sliding sleeve, wherein the elastic buckle has a buckle portion protruding out of an opening of the sliding sleeve.

8. The optical connector of claim 7, wherein the elastic buckle has an elastic arm, a free end of the elastic arm has a leaning portion, which is buckled into the sliding sleeve.

9. The optical connector of claim 7, wherein the elastic buckle has a third guiding structure, which is slidably disposed on the second guiding structure.

10. The optical connector of claim 1, wherein the housing has a pair of side surfaces in a second axial direction, each side surface has at least one first positioning structure, and the terminal module has at least one second positioning structure engaged with the corresponding first positioning structure.

* * * * *